(12) United States Patent
Zhang et al.

(10) Patent No.: US 10,536,098 B2
(45) Date of Patent: Jan. 14, 2020

(54) PIEZOELECTRIC ENERGY HARVESTER FOR HUMAN MOTION

(71) Applicant: ANALOG DEVICES, INC., Norwood, MA (US)

(72) Inventors: Qian Zhang, Woburn, MA (US); Yingqi Jiang, Bedford, MA (US); Kuang L. Yang, Newton, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 325 days.

(21) Appl. No.: 15/042,432

(22) Filed: Feb. 12, 2016

(65) Prior Publication Data
US 2017/0237368 A1    Aug. 17, 2017

(51) Int. Cl.
*H01L 41/113* (2006.01)
*H02N 2/18* (2006.01)
*F03G 5/06* (2006.01)

(52) U.S. Cl.
CPC ............ *H02N 2/18* (2013.01); *F03G 5/06* (2013.01)

(58) Field of Classification Search
CPC ................................ H02N 2/18; H01L 41/113
See application file for complete search history.

(56) References Cited

U.S. PATENT DOCUMENTS

| | | | |
|---|---|---|---|
| 5,512,795 A | 4/1996 | Epstein et al. | |
| 5,835,996 A | 11/1998 | Hashimoto et al. | |
| 7,176,601 B2 * | 2/2007 | Tanaka | H02N 2/183 310/339 |
| 7,239,066 B2 * | 7/2007 | Ott | H01L 41/1136 310/331 |
| 7,345,407 B2 | 3/2008 | Tanner | |
| 7,511,404 B2 * | 3/2009 | Lee | H02N 2/18 310/329 |
| 8,674,528 B2 * | 3/2014 | Kobayakawa | B60C 23/041 290/1 R |
| 8,941,288 B2 * | 1/2015 | Okabayashi | H02N 2/18 310/339 |
| 9,525,323 B1 * | 12/2016 | Lee | H02K 7/1853 |

(Continued)

FOREIGN PATENT DOCUMENTS

| | | |
|---|---|---|
| CN | 103490667 | 1/2014 |
| CN | 104158438 | 11/2014 |

(Continued)

OTHER PUBLICATIONS

Robert Lockhart et al., *A Wearable System of Micromachined Piezoelectric Cantilevers Coupled to a Rotational Oscillating Mass for On-Body Energy Harvesting*, 978-1-4799-3509-3/14 © 2014 IEEE, MEMS 2014, San Francisco, CA, USA, Jan. 26-30, 2014, 4 pages.

(Continued)

*Primary Examiner* — J. San Martin
(74) *Attorney, Agent, or Firm* — Patent Capital Group

(57) ABSTRACT

An exemplary energy harvester includes a piezoelectric diaphragm, an eccentric mass that rotates in response to external motion, and a piezoelectric stress inducer coupled with the eccentric mass and the piezoelectric diaphragm. The piezoelectric stress inducer deforms the piezoelectric diaphragm in response to rotational motion of the eccentric mass, causing the piezoelectric diaphragm to generate electrical energy.

26 Claims, 6 Drawing Sheets

(56) References Cited

U.S. PATENT DOCUMENTS

| | | | | |
|---|---|---|---|---|
| 2012/0299443 | A1* | 11/2012 | Okabayashi | H02N 2/18 310/319 |
| 2013/0069487 | A1* | 3/2013 | Houser | H02N 2/18 310/339 |
| 2014/0001764 | A1 | 1/2014 | Greenwood | |
| 2015/0084482 | A1* | 3/2015 | Yeatman | H02K 7/1892 310/319 |
| 2015/0358737 | A1 | 12/2015 | Yang et al. | |
| 2017/0027220 | A1* | 2/2017 | Sebastian | A24F 15/18 |

FOREIGN PATENT DOCUMENTS

| | | | | |
|---|---|---|---|---|
| FR | 3010910 | A1 * | 3/2015 | A43B 3/0015 |
| WO | 2013/164648 | | 11/2013 | |
| WO | 2014/116794 | | 7/2014 | |
| WO | 2015/157377 | | 10/2015 | |
| WO | 2017/139554 | | 8/2017 | |

OTHER PUBLICATIONS

Guang Zhu et al., *Radial-Arrayed Rotary Electrification for High Performance Triboelectric Generator*, Nature Communications, Accepted Feb. 11, 2014, published Mar. 4, 2014, © 2014 Macmillian Publishers Limited, 9 pages.

E. Romero et al., *Rotational Energy Harvester for Body Motion*, 978-1-4244-9634-1/11 © 2011 IEEE, MEMS 2011, Cancun, Mexico, Jan. 23-27, 2011, 4 pages.

Jingjing Zhao et al., *A Shoe-Embedded Piezoelectric Energy Harvester for Wearable Sensors*, Sensors 2014, 14, 12497-12510; doi:10.3390/s140712497, www.mdpi.com/journal/sensors, 14 pages.

International Search Report and Written Opinion issued in PCT Patent Application Serial No. PCT/US2017/017341 dated Jun. 20, 2017, 18 pages.

* cited by examiner

PIEZOELECTRIC ENERGY HARVESTER FOR HUMAN MOTION

TECHNICAL FIELD

The present disclosure relates generally to energy harvesters, and more particularly, piezoelectric energy harvesters for human motion.

BACKGROUND

Kinetic energy harvesting, which involves converting mechanical energy from human motion into electrical energy, provides promising means for powering electronic devices, particularly in wearable, implantable, and/or portable devices. Although existing energy harvesters have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

OVERVIEW OF EXAMPLE EMBODIMENTS

Energy harvesters disclosed herein are configured to maximize transfer of mechanical energy from motion, such as human motion, to piezoelectric energy harvesting mechanisms, which generate electrical energy. An exemplary energy harvester includes a piezoelectric diaphragm, an eccentric mass that rotates in response to external motion, and a piezoelectric stress inducer coupled with the eccentric mass and the piezoelectric diaphragm. The piezoelectric stress inducer deforms the piezoelectric diaphragm in response to rotational motion of the eccentric mass, causing the piezoelectric diaphragm to generate electrical energy. The disclosed energy harvesters can be implemented for powering electronic devices, particularly wearable devices, internet of things, and/or healthcare applications.

DETAILED DESCRIPTION OF EXAMPLE EMBODIMENTS

Kinetic energy harvesting, which involves converting mechanical energy from human motion into electrical energy, provides promising means for powering electronic devices. If properly harnessed, human motion can be implemented to supplement or replace batteries used for powering electronic devices, particularly in wearable, portable, and/or implantable devices, internet of things, and/or healthcare applications. Kinetic energy harvesters can employ various energy harvesting mechanisms, such as electromagnetic energy harvesting mechanisms (which generate electrical energy from electromagnetic fields) and piezoelectric harvesting mechanisms (which generate electrical energy from mechanical stress applied to piezoelectric materials). Piezoelectric energy harvesting mechanisms exhibit greater power output than electromagnetic energy harvesting mechanisms, particularly for micro-scale kinetic energy harvesters. However, since human motion is typically random and occurs at extremely low frequencies (for example, a few Hertz), challenges exist with how to effectively transfer mechanical energy from human motion to piezoelectric materials for generating electrical energy. The present disclosure provides energy harvesters configured to maximize transfer of mechanical energy from human motion to piezoelectric energy harvesting mechanisms.

Figure 1A:
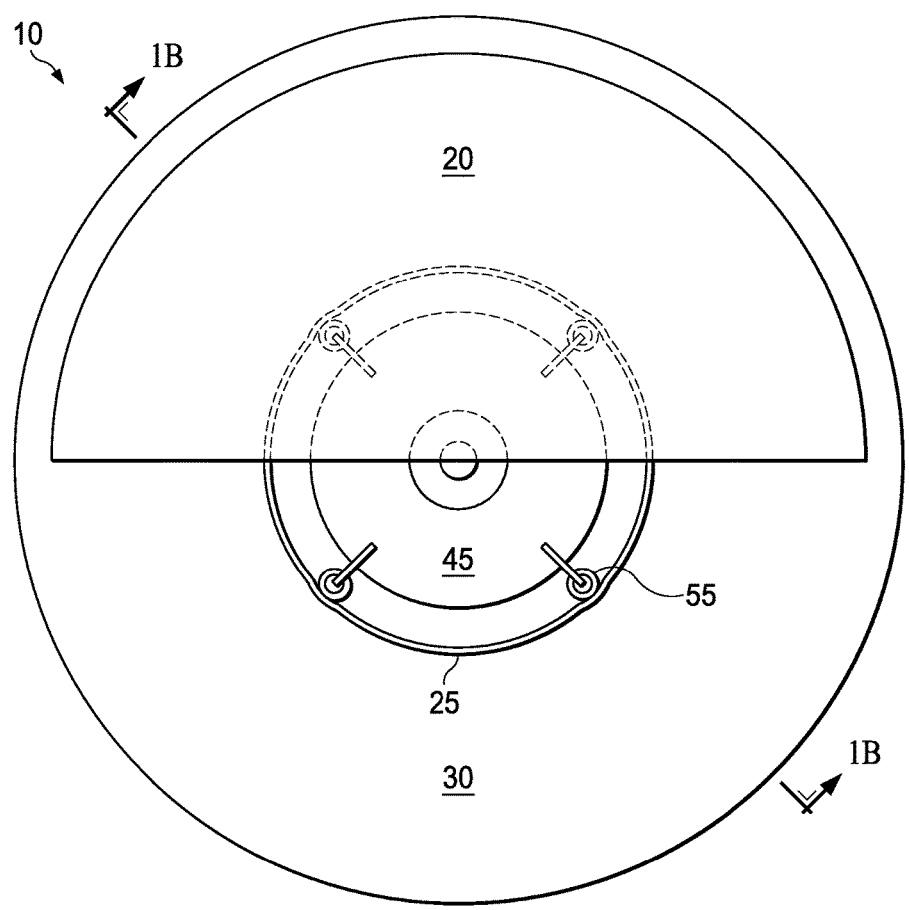
FIGS. 1A-1D are simplified views of an exemplary energy harvester according to various aspects of the present disclosure.
Figure 1B:
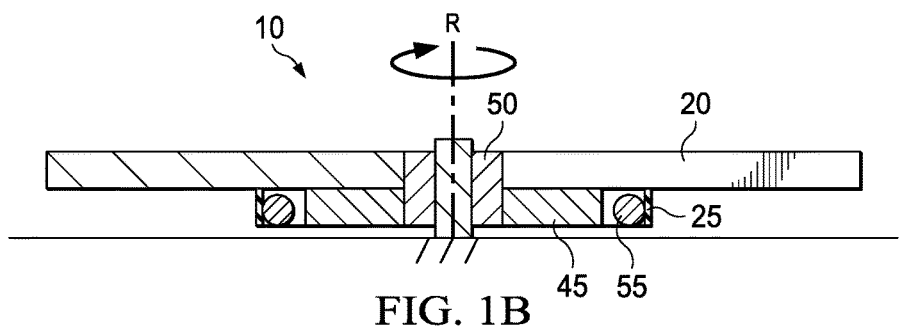
Figure 1C:
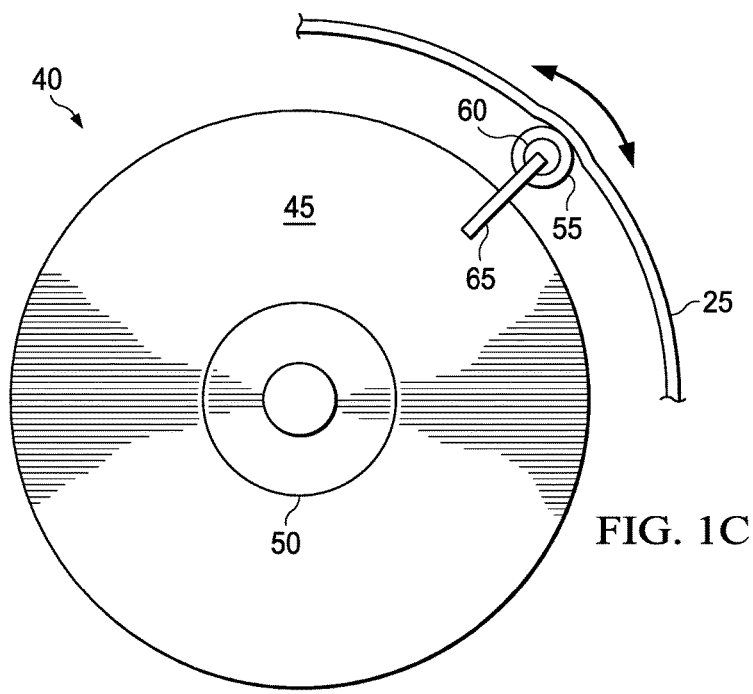
Figure 1D:
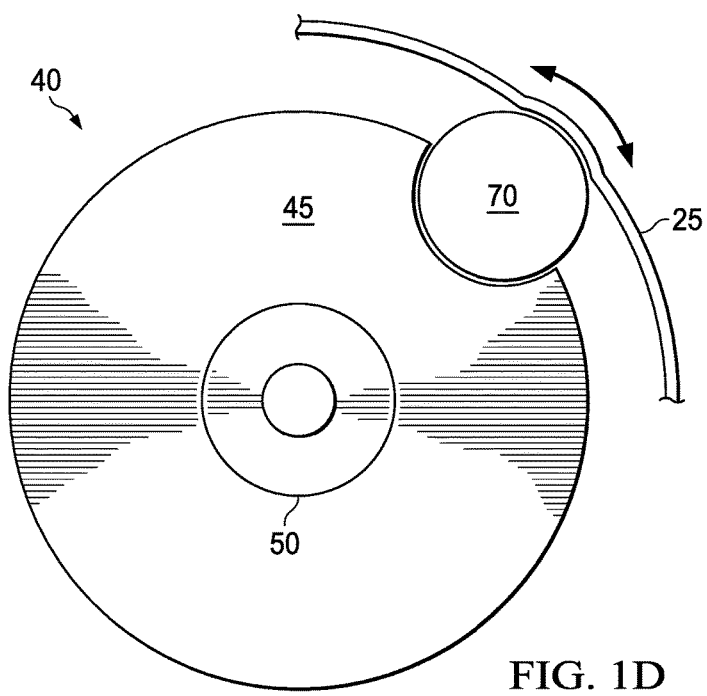

FIG. 1A is a simplified top diagrammatic view of an exemplary energy harvester 10 according to various aspects of the present disclosure, FIG. 1B is a simplified cross-sectional view of energy harvester 10 along line 1B-1B of FIG. 1A according to various aspects of the present disclosure; FIG. 1C is a magnified top diagrammatic view of a portion of energy harvester 10 in FIG. 1A according to various aspects of the present disclosure; and FIG. 1D is a magnified top diagrammatic view of a portion of energy harvester 10 according to various aspects of the present disclosure. Energy harvester 10 converts mechanical energy into electrical energy. In various implementations, energy harvester 10 captures (scavenges) and transforms mechanical energy from motion (such as human motion) into electrical energy, which can be stored and managed for powering electronic devices. For example, energy harvester 10 can be implemented to power a wearable, portable, and/or implantable device, supplementing or even replacing batteries typically implemented for powering such devices. Energy harvester 10 can be implemented for providing power in electronics applications, internet of things applications, healthcare applications, and/or other applications. For ease of discussion, FIGS. 1A-1D will be described concurrently, and FIGS. 1A-1D have been simplified for the sake of clarity to better understand the inventive concepts of the present disclosure. Additional features can be added in energy harvester 10, and some of the features described can be replaced, modified, or eliminated in other embodiments of energy harvester 10.

Energy harvester 10 includes a piezoelectric energy harvesting mechanism that converts (transfers) mechanical energy, such as that from human motion, into electrical energy. The piezoelectric energy harvesting mechanism includes an eccentric mass 20 and a piezoelectric diaphragm 25 arranged in a housing 30. As described below, eccentric mass 20 applies mechanical stress to piezoelectric diaphragm 25 as eccentric mass 20 (alternatively referred to as an eccentric rotating mass) freely rotates around an axis of rotation R in response to motion, causing piezoelectric diaphragm 25 to generate electrical energy. Piezoelectric diaphragm 25 includes any material that generates electrical energy (for example, accumulates charge) in response to applied mechanical stress or pressure. Conversely, the material generates mechanical strain in response to applied electrical energy, such as an applied electrical field. This phenomenon is referred to as piezoelectric effect. Exemplary piezoelectric materials include lead zirconate titanate (PZT), polyvinylidene difluoride (PVDF), quartz, other suitable piezoelectric material, or combination thereof. In FIG. 1A, though eccentric mass 20 is depicted as a semicircle, and piezoelectric diaphragm 25 is depicted as a piezoelectric ring or piezoelectric circle, the present disclosure contemplates eccentric mass 20 and piezoelectric diaphragm 25 having any shape and/or configuration that facilitates the energy harvesting mechanisms described herein. In some implementations, piezoelectric diaphragm 25 includes more than one piezoelectric component, such as more than one piezoelectric ring. In some implementations, piezoelectric diaphragm 25 includes more than one piezoelectric section. For example, in some implementations, piezoelectric diaphragm 25 includes four piezoelectric material sections configured to form a circle, where each piezoelectric material section is configured as a quarter of the circle.

In FIGS. 1A-1C, energy harvester 10 includes a piezoelectric stress inducer 40 that connects mechanical energy collected by eccentric mass 20 to piezoelectric diaphragm 25. Piezoelectric stress inducer 40 is coupled with eccentric mass 20, and eccentric mass 20 drives (controls operation/ movement of) piezoelectric stress inducer 40 as eccentric mass 20 rotates around axis of rotation R. Piezoelectric stress inducer 40 physically contacts piezoelectric diaphragm 25, deforming (deflecting) piezoelectric diaphragm 25 when piezoelectric stress inducer 40 moves in response to rotational motion of eccentric mass 20. Piezoelectric stress inducer 40 includes a proof mass 45, a bearing 50, proof masses 55, bearings 60, and proof mass connectors 65. Proof mass 45 is rotationally connected to bearing 50, such that proof mass 45 rotates around bearing 50. Each proof mass 55 is rotationally connected to a respective bearing 60, such that proof masses 55 rotate around respective bearings 60. In various implementations, proof mass 45 and proof masses 55 are rotors. Proof mass connectors 65 connect rotational motion of proof mass 45 with proof masses 55. For example, in FIG. 1C, proof mass connector 65 connects proof mass 45 to bearing 60, such that rotational motion of proof mass 45 causes rotational motion of proof mass 55 via bearing 60. Proof mass connectors 65 can have any connecting and/or linking components that link rotational motion of proof mass 45 with rotational motion of proof masses 55. Proof masses 55 physically contact piezoelectric diaphragm 25, such that proof masses 55 mechanically stress piezoelectric diaphragm 25 as proof masses 55 move in response to rotational motion of proof mass 45. Configuring proof masses 55 to rotate around respective bearings 60 reduces friction between proof masses 55 and piezoelectric diaphragm 25 as proof masses 55 roll along piezoelectric diaphragm 25 in response to rotational motion of proof mass 45.

Alternatively, as depicted in FIG. 1D, proof masses 55 may be replaced with proof masses 70, where piezoelectric stress inducer 40 includes proof mass 45, bearing 50, and proof masses 70. In FIG. 1D, each proof mass 70 is connected to proof mass 45, such that rotational motion of proof mass 45 causes motion of proof masses 70. In various implementations, proof mass 45 is a rotor, and proof masses 70 are rolling balls. Any connecting and/or linking components can be implemented to link rotational motion of proof mass 45 with motion of proof masses 70. Proof masses 70 physically contact piezoelectric diaphragm 25, such that proof masses 70 mechanically stress piezoelectric diaphragm 25 as proof masses 70 move in response to rotational motion of proof mass 45. Configuring proof masses 70 to roll in relation to proof mass 45 can further reduce friction between proof masses 70 and piezoelectric diaphragm 25 as proof masses 70 roll along piezoelectric diaphragm 25 in response to rotational motion of proof mass 45. In some implementations, piezoelectric stress inducer 40 can include a combination of proof masses 55 and proof masses 70. The present disclosure contemplates any number, shape, configuration, and/or combination for bearings 50, proof masses 55, bearings 60, proof mass connectors 65, and/or proof masses 70 that facilitate the energy harvesting mechanisms described herein.

In operation, eccentric mass 20 applies mechanical stress on piezoelectric diaphragm 25 via piezoelectric stress inducer 40 as eccentric mass 20 rotates within housing 30 around axis of rotation R in response to motion, such as human motion. For example, energy harvester 10 is configured to connect rotational motion of eccentric mass 20 with rotational motion of proof mass 45 and proof masses 55 (and/or proof masses 70), allowing eccentric mass 20 to drive proof mass 45 and proof masses 55 (and/or proof masses 70). In FIGS. 1A-1C, eccentric mass 20 is rotationally connected to bearing 50, such that eccentric mass 20 rotates around bearing 50. Eccentric mass 20 is also connected to proof mass 45, so that rotational motion of eccentric mass 20 causes rotational motion of proof mass 45. As proof mass 45 rotates in response to rotational motion of eccentric mass 20, proof masses 55 rotate in response to rotational motion of proof mass 45 (for example, because bearings 60 and proof mass connectors 65 move together with proof mass 45). Bearing 50 and bearings 60 allow rotational motion of eccentric mass 20 to drive proof masses 55, as bearing 50 and bearings 60 also rotate around the same point (for example, axis of rotation R) as eccentric mass 20. Because proof masses 55 remain in physical contact with piezoelectric diaphragm 25, as long as eccentric mass 20 rotates in response to a tiniest of movement, proof masses 55 will cause stress variation on piezoelectric diaphragm 25. Proof masses 55 roll along piezoelectric diaphragm 25, deflecting or deforming piezoelectric diaphragm 25, which causes piezoelectric diaphragm 25 to generate electrical energy. Essentially, since proof masses 55 contact piezoelectric diaphragm 25 and apply stress to piezoelectric diaphragm in response to motion of eccentric mass 20, energy harvester 10 can generate power in response to any motion of eccentric mass 20 (in other words, no minimum degree of rotation is required). In various implementations, eccentric mass 20 has a mass (in some examples, as heavy as possible) that maximizes transfer of mechanical energy from external motion (such as human motion) to piezoelectric diaphragm 25. Energy harvester 10 thus generates power from piezoelectric diaphragm 25 in response to rotational motion of eccentric mass 20. Any appropriate electronics circuitry can harvest electrical energy generated by piezoelectric diaphragm 25, which can be used for powering a load or stored, for example, by capacitors and/or batteries.

Figure 2A:
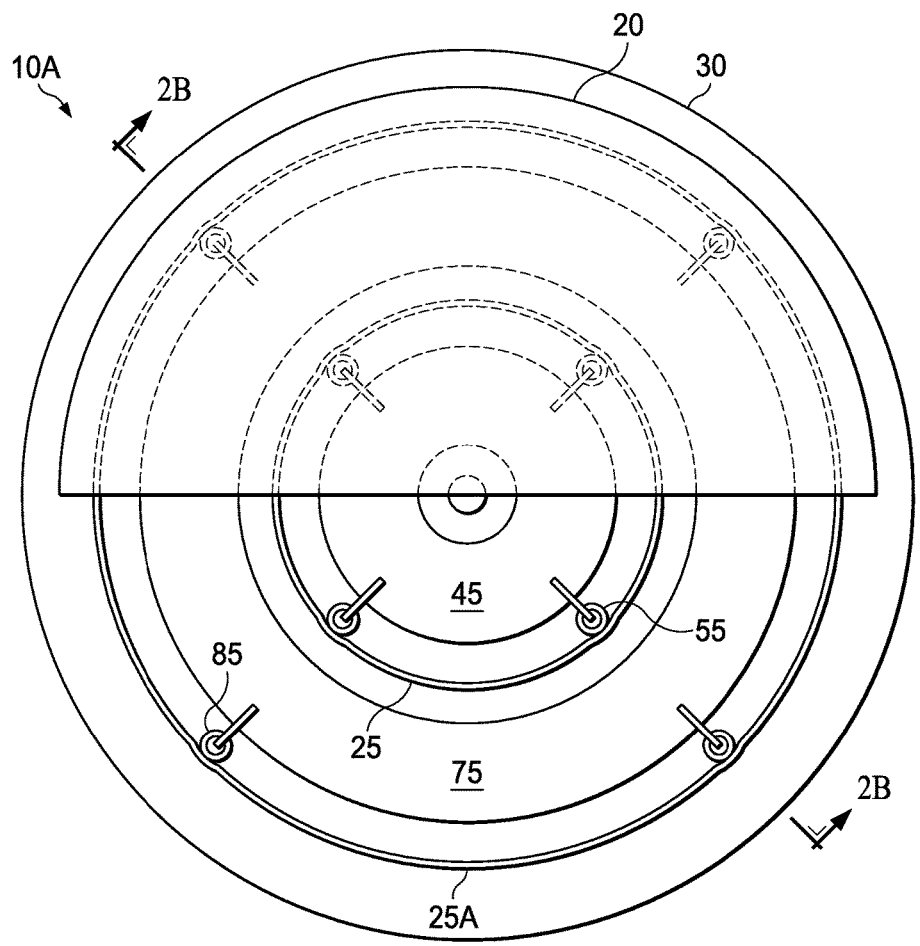
FIGS. 2A-2D are simplified views of an exemplary energy harvester according to various aspects of the present disclosure.
Figure 2B:
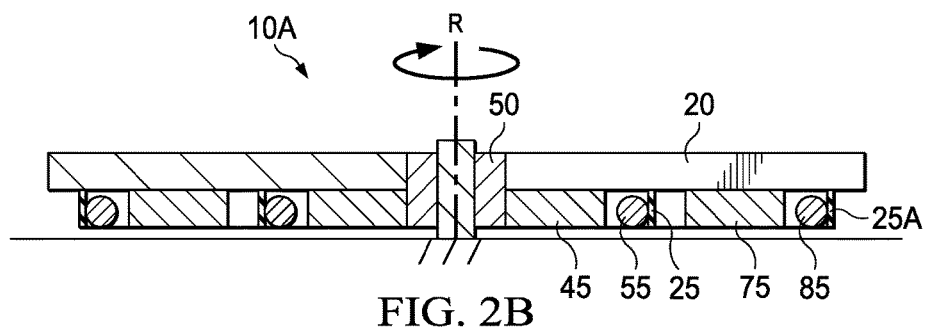
Figure 2C:
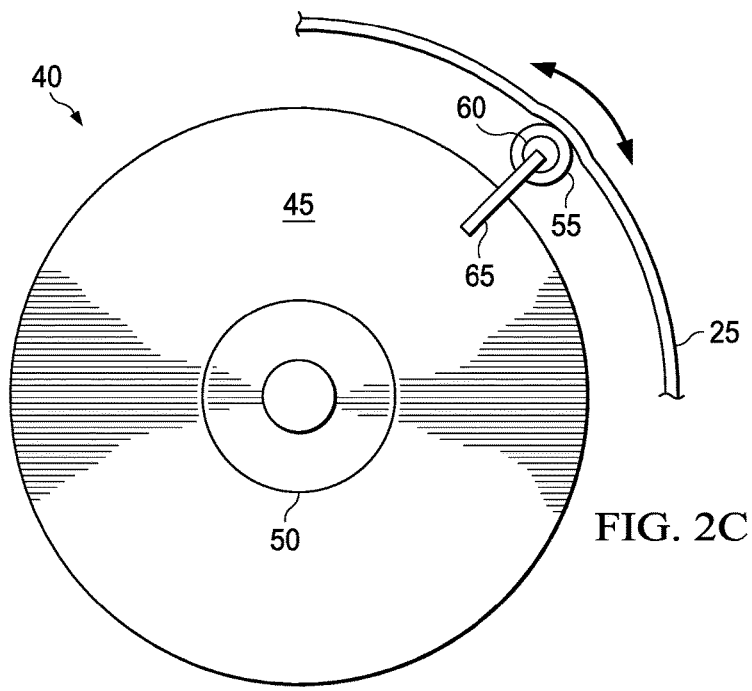
Figure 2D:
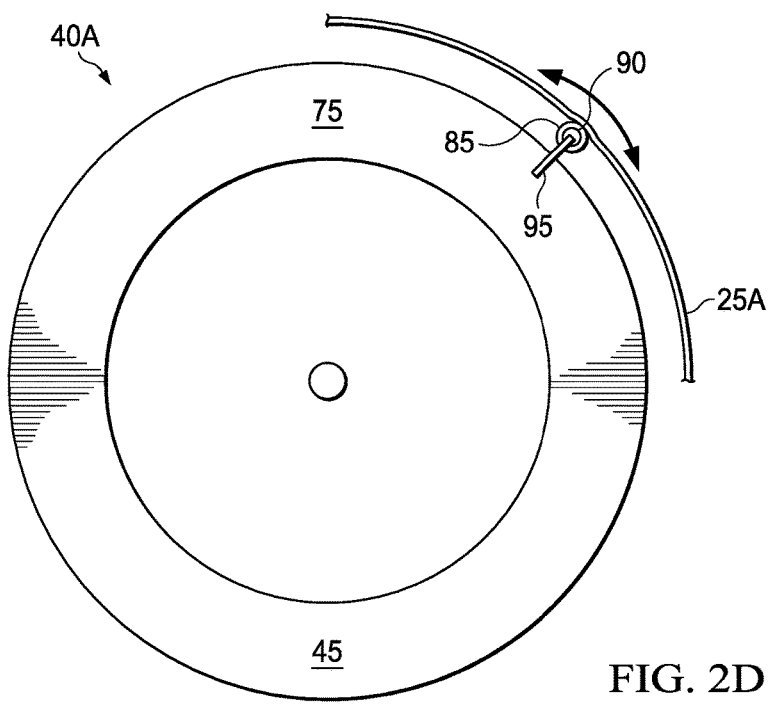

FIG. 2A is a simplified top diagrammatic view of an exemplary energy harvester 10A according to various aspects of the present disclosure, FIG. 2B is a simplified cross-sectional view of energy harvester 10A along line 2B-2B in FIG. 2A according to various aspects of the present disclosure; FIG. 2C is a magnified top diagrammatic view of a portion of energy harvester 10A in FIG. 2A according to various aspects of the present disclosure; and FIG. 2D is a magnified top diagrammatic view of a portion of energy harvester 10A in FIG. 2A according to various aspects of the present disclosure. Energy harvester 10A converts mechanical energy into electrical energy. In various implementations, energy harvester 10A captures (scavenges) and transforms mechanical energy from motion (such as human motion) into electrical energy, which can be stored and managed for powering electronic devices. For example, energy harvester 10A can be implemented to power a wearable, portable, and/or implantable device, supplementing or even replacing batteries typically implemented for powering such devices. Energy harvester 10A can be implemented for providing power in electronics applications, internet of things applications, healthcare applications, and/or other applications. For ease of discussion, FIGS. 2A-2D will be described concurrently. FIGS. 2A-2D have been simplified for the sake of clarity to better understand the inventive concepts of the present disclosure. Additional features can be added in energy harvester 10A, and some of the features described can be replaced, modified, or eliminated in other embodiments of energy harvester 10A.

Energy harvester 10A of FIGS. 2A-2D is similar in many respects to energy harvester 10 of FIGS. 1A-1C. Accordingly, similar features in FIGS. 1A-1C and FIGS. 2A-2D are identified by the same reference numerals for clarity and simplicity. To increase power output, energy harvester 10A includes a piezoelectric diaphragm that includes more than one piezoelectric ring for generating electrical energy. For example, energy harvester 10A includes piezoelectric diaphragm 25 and a piezoelectric diaphragm 25A, which can collectively be referred to as a piezoelectric ring. In FIGS. 2A-2D, a piezoelectric stress inducer includes piezoelectric stress inducer 40 configured to connect mechanical energy collected by eccentric mass 20 to piezoelectric diaphragm 25, and a piezoelectric stress inducer 40A configured to connect mechanical energy collected by eccentric mass 20 to piezoelectric diaphragm 25A. For example, piezoelectric stress inducer 40A includes a proof mass 75, proof masses 85, bearings 90, and proof mass connectors 95. Proof mass 75 is connected to eccentric mass 20, so that rotational motion of eccentric mass 20 causes rotational motion of proof mass 75. Each proof mass 85 is rotationally connected to a respective bearing 90, such that proof masses 85 rotate around respective bearings 90. In various implementations, proof mass 75 and proof masses 85 are rotors. Proof mass connectors 95 connect rotational motion of proof mass 75 with proof masses 85. For example, in FIG. 2D, proof mass connector 95 connects proof mass 75 to bearing 90, such that rotational motion of proof mass 75 causes rotational motion of proof mass 85 via bearing 90. Proof mass connectors 95 can have any connecting and/or linking components that link rotational motion of proof mass 75 with rotational motion of proof masses 85. Proof masses 85 physically contact piezoelectric diaphragm 25A, such that proof masses 85 mechanically stress piezoelectric diaphragm 25A as proof masses 85 move in response to rotational motion of proof mass 75. The present disclosure contemplates any number, shape, configuration, and/or combination for bearings 50, proof masses 55, bearings 60, proof mass connectors 65, proof masses 75, proof masses 85, bearings 90, and/or proof mass connectors 95 that facilitate the energy harvesting mechanisms described herein.

To further increase power output, energy harvester 10 can implement the piezoelectric energy harvesting mechanisms described above with other power generation mechanisms, such as electromagnetic energy harvesting mechanisms and/or electrostatic energy harvesting mechanisms. In such configurations, as rotating eccentric mass 20 causes piezoelectric diaphragm 25 to generate electricity, rotating eccentric mass 20 can simultaneously cause magnetic flux changes and/or electrostatic charge changes.

Figure 3:
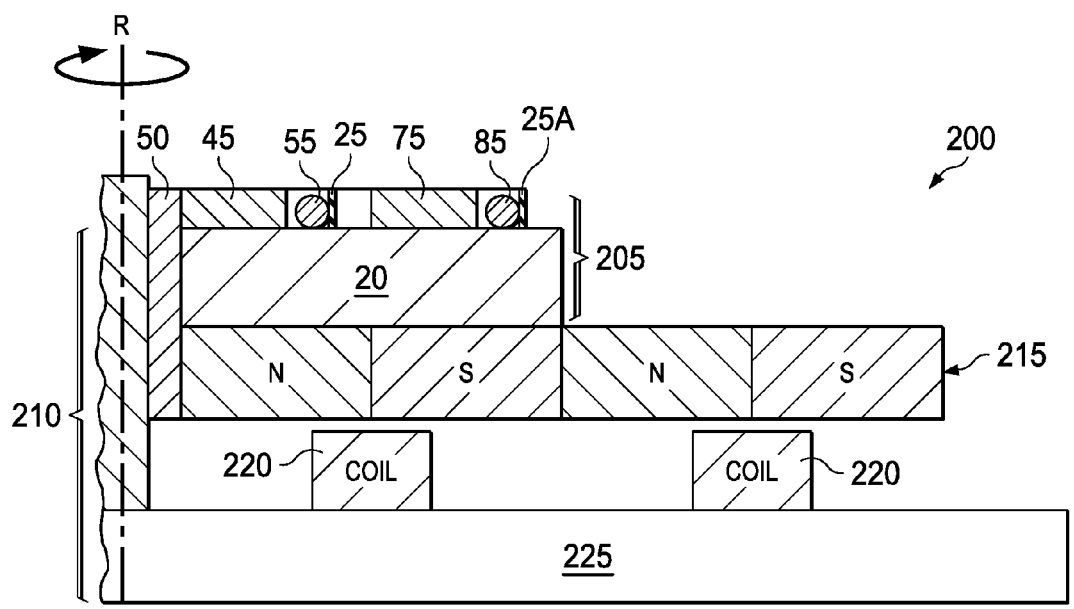
FIG. 3 is a simplified view of an exemplary energy harvester according to various aspects of the present disclosure.

FIG. 3 is a simplified cross-sectional view of an exemplary energy harvester 200 according to various aspects of the present disclosure according to various aspects of the present disclosure. Energy harvester 200 is configured to convert simultaneously mechanical energy into electrical energy. In various implementations, energy harvester 200 captures (scavenges) and transforms mechanical energy from motion (such as human motion) into electrical energy, which can be stored and managed to provide power in electronics applications. Energy harvester 200 includes a piezoelectric energy harvesting mechanism 205, which generates electrical energy in response to mechanical stress, and an electromagnetic energy harvesting mechanism 210, which generates electrical energy in response to an electromagnetic field. Rotational motion of eccentric mass 20 can simultaneously provide the mechanical stress and the electromagnetic field necessary respectively for piezoelectric energy harvesting mechanism 205 and electromagnetic energy harvesting mechanism 210 to generate electrical energy. Piezoelectric energy harvesting mechanism 205 can be configured as the piezoelectric energy harvesting mechanisms described above with reference to FIGS. 1A-1D and FIGS. 2A-2C. For example, piezoelectric energy harvesting mechanism 205 can include piezoelectric diaphragm 25 and piezoelectric diaphragm 25A, which can generate electrical energy in response to mechanical stress applied thereto by eccentric mass 20 via piezoelectric stress inducer 40. Electromagnetic energy harvesting mechanism 210 generates electrical energy in response to a change in magnetic flux caused by rotational motion of eccentric mass 20. For example, electromagnetic energy harvesting mechanism 210 can include a magnetic layer 215 and coils 220 disposed over a substrate 225. Magnetic layer 215 is rotationally connected to bearing 50, such that magnetic layer 215 rotates around bearing 50. Eccentric mass 20 can drive magnetic layer 215, where rotational motion of eccentric mass 20 causes rotational motion of magnetic layer 215 (which serves as a rotor). Rotational motion of magnetic layer 215 generates magnetic flux changes through coils 220 (which serve as stators), causing coils 220 to generate electrical energy. In various implementations, electromagnetic energy harvesting mechanism 210 can be configured as described in Romero, E. et al, "Rotational Energy Harvester for Body Motion", Micro Electro Mechanical Systems (MEMS), 2011 IEEE 24th International Conference on pages 1325-1328 (23-27 Jan. 2011), the entire disclosure of which is incorporated herein by reference. In such implementations, piezoelectric energy harvesting mechanism 205 and electromagnetic energy harvesting mechanism 210 can use the same eccentric mass, eccentric mass 20, and the same bearing, bearing 50, for generating electrical energy. FIG. 3 has been simplified for the sake of clarity to better understand the inventive concepts of the present disclosure. Additional features can be added in energy harvester 200, and some of the features described can be replaced, modified, or eliminated in other embodiments of energy harvester 200.

Figure 4:
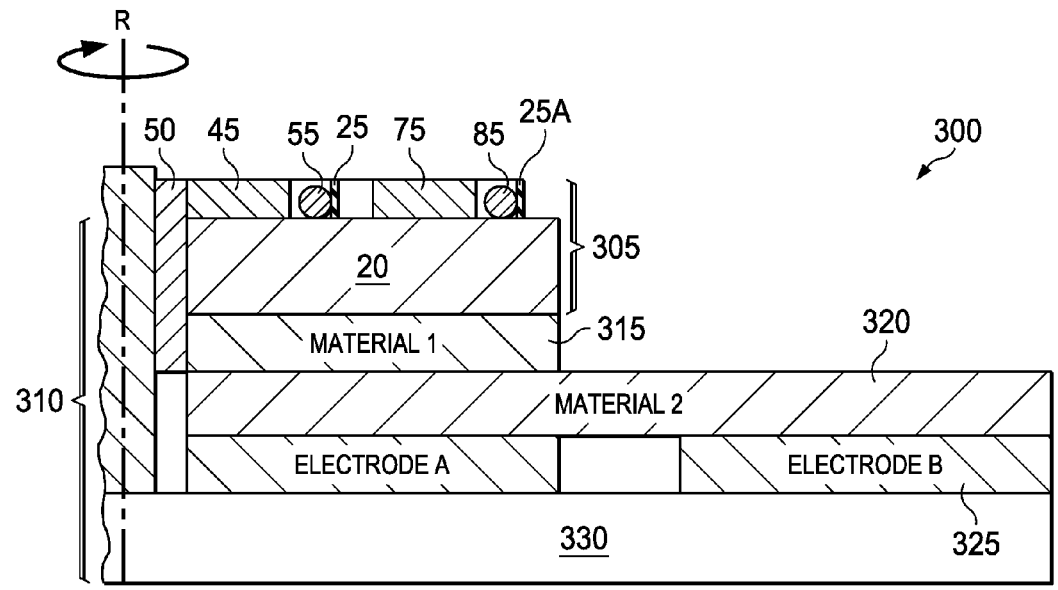
FIG. 4 is a simplified view of an exemplary energy harvester according to various aspects of the present disclosure.

FIG. 4 is a simplified cross-sectional view of an exemplary energy harvester 300 according to various aspects of the present disclosure according to various aspects of the present disclosure. Energy harvester 300 is configured to convert simultaneously mechanical energy into electrical energy. In various implementations, energy harvester 300 captures (scavenges) and transforms mechanical energy from motion (such as human motion) into electrical energy, which can be stored and managed to provide power in electronics applications. Energy harvester 300 includes a piezoelectric energy harvesting mechanism 305, which generates electrical energy in response to mechanical stress, and an electrostatic energy harvesting mechanism 310, which generates electrical energy in response to an electrostatic charge. Rotational motion of eccentric mass 20 can simultaneously provide the mechanical stress and the electrostatic charge necessary respectively for piezoelectric energy harvesting mechanism 305 and an electrostatic energy harvesting mechanism 310 to generate electrical energy. Piezoelectric energy harvesting mechanism 305 can be configured as the piezoelectric energy harvesting mechanisms described above with reference to FIGS. 1A-1D and FIGS. 2A-2C. For example, piezoelectric energy harvesting mechanism 305 can include piezoelectric diaphragm 25 and piezoelectric diaphragm 25A, which generate electrical energy in response to mechanical stress applied thereto by eccentric mass 20 via piezoelectric stress inducer 40. Electrostatic energy harvesting mechanism 310 can generate electrical energy in response to a change in electrostatic charge caused by rotational motion of eccentric mass 20. In various implementations, electrostatic energy harvesting mechanism 310 can be configured as a triboelectric energy harvesting mechanism. For example, electrostatic energy harvesting mechanism 310 can include a material layer 315, a material layer 320, and an electrode layer 325 disposed over a substrate 330. Material layer 315 is rotationally connected to bearing 50, such that material layer 315 rotates around bearing 50. Eccentric mass 20 can drive material layer 315, where rotational motion of eccentric mass 20 causes rotational motion of material layer 315 (which serves as a rotor). Rotational motion of material layer 315 generates triboelectrification through material layer 320 and electrodes 325 (which serve as a stator), causing electrodes 325 to generate electrical energy. In various implementations, triboelectric energy harvesting mechanism 210 can be configured as described in Zhu, G. et al, "Radial-arrayed rotary electrification for high performance triboelectric generator", Nature Communications, Article No. 3426 (4 Mar. 2014), the entire disclosure of which is incorporated herein by reference. In such implementations, piezoelectric energy harvesting mechanism 305 and electrostatic energy harvesting mechanism 310 can use the same eccentric mass, eccentric mass 20, and the same bearing, bearing 50, for generating electrical energy. FIG. 4 has been simplified for the sake of clarity to better understand the inventive concepts of the present disclosure. Additional features can be added in energy harvester 300, and some of the features described can be replaced, modified, or eliminated in other embodiments of energy harvester 300.

Figure 5:
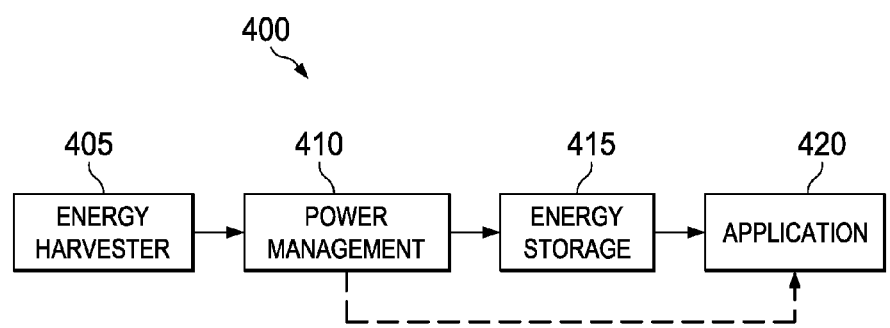
FIG. 5 is a simplified block diagram of an exemplary energy harvesting system according to various aspects of the present disclosure.

FIG. 5 is a simplified block diagram of an exemplary energy harvesting system 400 according to various aspects of the present disclosure according to various aspects of the present disclosure. Energy harvesting system 400 can be implemented in a wearable, portable, and/or implantable device, where energy harvesting system 400 powers the wearable, portable, and/or implantable device from human motion. Energy harvesting system 400 includes an energy harvester component 405, a power management component 410, an energy storage component 415, and an application component 420. Energy harvester component 405 includes any of the energy harvesters described above with reference to FIGS. 1-4. Power management component 410 is configured to manage (distribute) electrical energy generated by energy harvester component 405. Power management component 410 can transfer electrical energy generated by energy harvester component 405 to energy storage component 415 or directly to application component 420. Energy storage component 415 is configured to store electrical energy, which can be used for powering application component 420. Application component 420 includes any load powered by electrical energy generated and/or stored by energy harvesting system 400. For example, application component 420 is a wireless sensor node in a wireless network system. In another example, application component 420 is a transceiver of an electronic device. In yet another example, application component 420 is any electronic circuit and/or electronic component powered by electrical energy generated by energy harvesting system 400. Application component 420 is powered by electrical energy from power management component 410 and/or from energy storage component 415. FIG. 5 has been simplified for the sake of clarity to better understand the inventive concepts of the present disclosure. Additional features can be added in energy harvesting system 400, and some of the features described can be replaced, modified, or eliminated in other embodiments of energy harvesting system 400.

In various implementations, the various components of the FIGURES can be implemented on a board of an associated electronic device. The board can be a general circuit board that can hold various components of an internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, other considerations, or a combination thereof. Other components, such as external storage, sensors, controllers for audio/video display, and peripheral devices may be attached to the board as plug-in cards, via cables, or integrated into the board itself.

In various implementations, the various components of the FIGURES can be implemented as stand-alone modules (for example, a device with associated components and circuitry configured to perform a specific application or function) or implemented as plug-in modules into application specific hardware of electronic devices. Note that particular embodiments of the present disclosure may be readily included in a system-on-chip (SOC) package, either in part, or in whole. An SOC represents an integrated circuit that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the various functions described herein may be implemented in one or more semiconductor cores (such as silicon cores) in application specific integrated circuits (ASICs), field programmable gate arrays (FPGAs), other semiconductor chips, or combinations thereof.

Note that the activities discussed above with reference to the FIGURES are applicable to any integrated circuits that involve signal processing, particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily be a part of smartphones, tablets, security systems, PCs, gaming technologies, virtual reality, simulation training, etc.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than a restrictive sense.

Note that with the numerous examples provided herein, interaction may be described in terms of two, three, four, or more processing components. However, this has been done for purposes of clarity and example only. It should be appreciated that the system can be consolidated in any suitable manner. Along similar design alternatives, any of the illustrated components, modules, circuits, and elements of the FIGURES may be combined in various possible configurations, all of which are clearly within the broad scope of this Specification. In certain cases, it may be easier to describe one or more of the functionalities of a given set of flows by only referencing a limited number of processing components. It should be appreciated that the processing components of the FIGURES and its teachings are readily scalable and can accommodate a large number of components, as well as more complicated/sophisticated arrangements and configurations. Accordingly, the examples provided should not limit the scope or inhibit the broad teachings of the processing system and/or components as potentially applied to a myriad of other architectures.

Further, note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. It is further noted that "coupled to" and "coupled with" are used interchangeably herein, and that references to a feature "coupled to" or "coupled with" another feature include any communicative coupling means, electrical coupling means, mechanical coupling means, other coupling means, or a combination thereof that facilitates the feature functionalities and operations, such as the security check mechanisms, described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. An energy harvester comprising:
   a piezoelectric diaphragm;
   an eccentric mass that rotates in response to external motion; and
   a piezoelectric stress inducer coupled with the eccentric mass and the piezoelectric diaphragm, wherein the piezoelectric stress inducer deforms the piezoelectric diaphragm in response to rotational motion of the eccentric mass.

2. The energy harvester of claim 1, wherein the piezoelectric stress inducer includes a proof mass configured to roll along the piezoelectric diaphragm in response to rotational motion of the eccentric mass.

3. The energy harvester of claim 1, wherein the piezoelectric stress inducer includes:
   a first proof mass connected to the eccentric mass, such that rotational motion of the eccentric mass causes rotational motion of the first proof mass; and
   a second proof mass connected to the first proof mass, such that rotational motion of the first proof mass causes rotational motion of the second proof mass.

4. The energy harvester of claim 3, wherein the piezoelectric stress inducer further includes a first bearing and a second bearing, wherein the eccentric mass is rotationally connected to the first bearing and the second mass is rotationally connected to the second bearing.

5. The energy harvester of claim 3, wherein the second proof mass physically contacts the piezoelectric diaphragm.

6. The energy harvester of claim 3, wherein the first proof mass is a rotor, and the second proof mass is a rotor.

7. The energy harvester of claim 3, wherein the first proof mass is a rotor, and the second proof mass is a rolling ball.

8. The energy harvester of claim 1, further comprising an electrostatic component configured to generate electrical energy in response to rotational motion of the eccentric mass.

9. The energy harvester of claim 8, wherein the eccentric mass and the electrostatic component are connected to a same bearing.

10. The energy harvester of claim 9, wherein the electrostatic component comprises two materials juxtaposed to one another.

11. The energy harvester of claim 1, further comprising an electromagnetic component configured to generate electrical energy in response to rotational motion of the eccentric mass.

12. The energy harvester of claim 11, wherein the eccentric mass and the electromagnetic energy component are connected to a same bearing.

13. The energy harvester of claim 1, wherein the piezoelectric diaphragm is substantially shaped like an annulus.

14. A method for generating electrical energy in response to human motion, the method comprising:
    collecting, by an eccentric mass, mechanical energy from human motion; and
    transferring, by rotational motion of the eccentric mass, the mechanical energy from human motion to a piezoelectric diaphragm.

15. The method of claim 14, wherein transferring the mechanical energy includes causing the piezoelectric diaphragm to deform in response to rotational motion of the eccentric mass.

16. The method of claim 15, wherein causing the piezoelectric diaphragm to deform includes rolling a proof mass along the piezoelectric diaphragm in response to rotational motion of the eccentric mass.

17. The method according to claim 15, wherein the piezoelectric diaphragm is substantially shaped like an annulus.

18. The method according to claim 17, further comprising transferring, by rotational motion of the eccentric mass, the mechanical energy from human motion to an electromagnetic component.

19. The method of claim 14, wherein transferring the mechanical energy includes:
    causing a first proof mass to rotate in response to the rotational motion of the eccentric mass; and
    causing a second proof mass to rotate in response to rotational motion of the first proof mass.

20. A device for converting mechanical energy from human motion into electrical energy, the device comprising:
    a piezoelectric diaphragm;
    an eccentric mass that rotates in response to human motion; and
    a piezoelectric stress inducer coupled with the eccentric mass and the piezoelectric diaphragm, wherein the piezoelectric stress inducer physical contacts the piezoelectric diaphragm.

21. The device of claim 20, wherein the piezoelectric stress inducer includes:
    a first proof mass connected to the eccentric mass, such that rotational motion of the eccentric mass causes rotational motion of the first proof mass; and
    a second proof mass connected to the first proof mass, such that rotational motion of the first proof mass causes rotational motion of the second proof mass.

22. The device of claim 21, wherein the piezoelectric stress inducer further includes a first bearing and a second bearing, wherein the eccentric mass is rotationally connected to the first bearing and the second mass is rotationally connected to the second bearing.

23. The device of claim 20, wherein the piezoelectric stress inducer includes a proof mass configured to roll along the piezoelectric diaphragm in response to rotational motion of the eccentric mass.

24. The device of claim 20, further comprising an electromagnetic component or an electrostatic component configured to generate electrical energy in response to rotational motion of the eccentric mass.

25. The device of claim 24, wherein the electrostatic component comprised two materials juxtaposed to one another.

26. The device of claim 20, wherein the piezoelectric diaphragm is substantially shaped like an annulus.

* * * * *